United States Patent [19]

Becker et al.

[11] 4,197,389

[45] Apr. 8, 1980

[54] HARDENING AGENT FOR AQUEOUS EPOXY RESIN COMPOSITIONS

[75] Inventors: Wilhelm Becker; Horst Karasmann, both of Hamburg, Fed. Rep. of Germany

[73] Assignee: Hoechst Aktiengesellschaft, Frankfurt am Main, Fed. Rep. of Germany

[21] Appl. No.: 924,050

[22] Filed: Jul. 12, 1978

[30] Foreign Application Priority Data

Jul. 18, 1977 [CH] Switzerland ............................ 8853/77

[51] Int. Cl.² ............................................... C08L 63/00
[52] U.S. Cl. ..................................... 528/103; 252/182; 260/29.2 EP; 260/573; 260/584 B; 428/413; 428/417; 428/418; 528/111; 528/393; 528/407; 525/507
[58] Field of Search ................. 260/29.2 EP, 830 TW, 260/573, 584 B; 528/103, 135, 111, 393, 407; 252/182

[56] References Cited

U.S. PATENT DOCUMENTS

| | | | |
|---|---|---|---|
| 3,154,429 | 10/1964 | Albrecht et al. | 117/139.5 |
| 3,639,344 | 2/1972 | Kinnemann et al. | 260/47 EN |
| 3,769,250 | 10/1973 | Nikles | 260/29.2 EP |
| 3,993,707 | 11/1976 | Cummings | 260/830 TW |
| 4,123,402 | 10/1978 | Thomassen | 260/29.2 EP |

*Primary Examiner*—Earl A. Nielsen
*Attorney, Agent, or Firm*—Gordon W. Hueschen

[57] ABSTRACT

A hardening agent for an aqueous epoxy resin composition comprising a reaction product of (a) at least one polyepoxide compound, (b) at least one polyalkylene polyether polyol and (c) at least one compound selected from the group consisting of aliphatic, cycloaliphatic and heterocyclic polyamine and wherein component (c) additionally may be reacted with (d) an unsaturated compound before or after the reaction with the adduct of components (a) and (b), process for preparing said hardening agent and hardenable film forming coating compositions comprising as essential ingredients said hardening agent, at least one polyfunctional epoxy compound (a) and water.

10 Claims, No Drawings

HARDENING AGENT FOR AQUEOUS EPOXY RESIN COMPOSITIONS

Polyamidoamines containing free amino groups are known and are prepared from alkylene polyamines and polymerised unsaturated natural fatty acids. The compounds can be used to harden epoxy resins (see for example "Epoxy Compounds and Epoxy Resins" by Dr. Alfred Paquin, Springer-Verlag Berlin/Göttingen/Heidelberg 1958, pages 511 to 516 and Lee and Neville "Handbook of Epoxy Resins", McGraw-Hill Book Co., New York, 1967, 10,1–10,12).

The hardening of epoxy resins using adducts which are obtained from polyamidoamines and polyepoxides in the absence of water has also been described in U.S. Pat. No. 3,280,054. Although German Offenlegungsschrift No. 1,520,918 mentions the preparation of hardenable aqueous dispersions of such adducts and epoxy resins, our tests have shown that the results obtained are frequently unsatisfactory. Thus, in some cases the adducts, especially those prepared from aromatic polyepoxides, are semi-solid and not completely dispersable in an aqueous medium, whilst aqueous dispersions which contain an aromatic epoxy resin and an adduct prepared from an aliphatic polyepoxide frequently have an undesirable thixotropic behaviour.

U.S. Pat. No. 3,383,347 describes the use of hardening agents of phenol-modified amines which may be a reaction product of a primary amino group of an aliphatic polyamine with a phenol or a reaction product of an aliphatic polyamine with a phenol and an aldehyde. However, these hardening agents give epoxy resin hardener emulsions having an insufficient processing time, and which form very brittle coatings and give an undesired rusty brown coloration in the presence of iron.

German Offenlegungsschrift No. 1,925,941 describes epoxy resin hardener emulsions which contain as a hardener component, an amino amid adduct which is formed by reaction of an aminoamide based on a fatty acid and an alkylene polyamine, with 10–40% by weight (relative to the weight of the relatively involatile aminoamide adduct fractions) of a monoepoxide consisting of an aliphatic monoepoxide having 2–12 carbon atoms or of a monoepoxide substituted by a phenyl radical.

These epoxy resin hardener emulsions are relatively unstable and precipitate water during processing. The coatings prepared therewith remain relatively soft and highly sensitive to mechanical factors, so that sufficiently stable protective coatings cannot be prepared therewith.

Swiss Pat. No. 487,955 describes hardenable aqueous dispersions, containing an epoxy resin hardener, which is liquid at room temperature, hydrogen being bonded in the hardener directly to nitrogen. The hardener may be obtained by addition of a non-aliphatic epoxide containing only one 1,2-epoxide group in a terminal position per molecule or of an aliphatic epoxide containing (on average) one or more 1,2-epoxide groups in a terminal position per molecule to a stoichiometric excess of a poly(aminoamide) condensation product obtained from an alkylene polyamine of formula $$H_2N-(-Alkylene-NH-)_n-H$$

(in which the Alkylene radical is an ethylene, propylene, butylene, pentylene or hexylene radical, and n represents an integer greater than zero) and a copolymer of an unsaturated conjugated fatty acid or an amide-forming acid derivative with an aromatic vinyl compound.

These aqueous dispersions also preferably contain a hardening accelerator. Suitable accelerators are compounds containing at least one tertiary amino nitrogen atom and a phenolic hydroxyl group. Furthermore, the dispersions contain orthophosphoric acid or a liquid aliphatic monocarboxylic acid, e.g. acetic acid. These epoxy resin hardener dispersions are also insufficiently stable and provide only relatively soft and mechanically sensitive protective coatings. Also, the presence of dissociating acids leads to instability in the dispersion, since the acid anion ($A^\ominus$) may react with the epoxide group according to the following reaction and thereby consume epoxide groups:

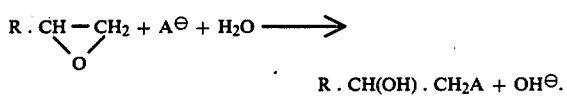

$$R \cdot CH(OH) \cdot CH_2A + OH^\ominus.$$

German Offenlegungsschrift No. 2,332,177 describes hardening agents for aqueous epoxy resin dispersions which are compositions comprising:

(1) a polyamidoamine epoxide adduct formed from a stoichiometric excess of a polyamidoamine (1a) obtained from a polyalkylene polyamine (in which the alkylene radical consists of an ethylene, propylene, butylene, pentylene or hexylene radical) and monomerised, dimerised and/or trimerised fatty acids or a copolymer of unsaturated conjugated fatty acids or amide-forming fatty acid derivatives (in which the fatty acids or fatty acid derivatives contain, in the monomeric form, 8 to 24 carbon atoms), with an aromatic vinyl compound and 5 to 35% by weight, relative to the polyamidoamine used, of an aliphatic epoxide compound (1b) having more than two, but not more than six, epoxide groups in a terminal position, and (2) 5 to 30% by weight, relative to the amount of polyamidoamine used, of a phenol-formaldehydepolyamine condensation product (in which the aliphatic, araliphatic, cycloaliphatic or heterocyclic polyamine contains at least two, but not more than eight, hydrogen atoms bonded directly to the nitrogen atoms thereof).

However, for the preparation of coatings, it is necessary to add to the mixture of epoxy resin prepolymer and hardening agent an organic solvent miscible with water, in order to reduce the viscosity of the composition and therefore make it more readily applied. Although the addition of organic solvents facilitates the application of the composition and produces films with good properties, they present a series of problems. Firstly the solvents are relatively expensive and often toxic and/or inflammable. Secondly, pollution by the solvents during preparation, storage, transport and final use of the compositions, solvent vapours, solvent waste from any necessary purification plant and spillage of solvent are further problems which are often difficult and expensive to solve. Due to these disadvantages, the use of known epoxy coating compositions is subject to a number of restrictions, especially when they are to be used in connection with foodstuffs. In addition, the cleaning of apparatus which has come into contact with such compositions presents considerable difficulties.

The object of the present invention is to make available an organic solvent-free hardening agent for aqueous epoxy resin compositions, which does not exhibit the above disadvantages and also provides resistant protecting coatings in conjunction with aqueous epoxy resin dispersions.

The absence of organic solvents overcomes any problems arising from odour, toxicity and/or inflammability; and in addition the apparatus coming into contact with the epoxy resin compositions can be cleaned by washing with water.

Thus, according to one aspect this invention provides a hardening agent for an aqueous epoxy resin dispersion, which hardening agent comprises a reaction product of (a) an at least one polyepoxide compound, (b) at least one polyalkylene polyether polyol, and (c) at least one compound selected from the group consisting of aliphatic, cycloaliphatic and heterocyclic polyamine.

In one embodiment of the invention, the hardening agent comprises a reaction product which has been obtained from 20 to 80% by weight of an adduct derived from (a) 2 to 4 equivalents of a polyepoxide compound and (b) 0.2 to 1.5 equivalents of a polyalkylene polyether polyol, by reaction with 80 to 20% by weight of component (c) comprising an aliphatic, cycloaliphatic and/or heterocyclic polyamine or polyamine mixture, the quantity of amine used being in 2 to 10 times excess, relative to the reacting epoxide groups and hydrogen atoms bonded to the nitrogen. Preferably, 50 to 70% by weight of an adduct consisting of (a) 2.3–3.0 equivalents of a polyepoxide compound and (b) 0.3–0.8 equivalents of a polyalkylene polyether polyol are reacted with 50-30% by weight of component (c) comprising an aliphatic, cycloaliphatic and/or heterocyclic polyamine or polyamine mixture, the quantity of amine used being in excess by 5 to 8 times relative to the reacting epoxide groups and amino hydrogen atoms.

In a further embodiment of the invention, the polyamine component (c) has added to it (d) unsaturated compounds which may undergo addition reactions, whereby for each hydrogen atom bonded to the nitrogen, component (c) is further reacted before or after reaction with the adduct of components (a) and (b) with up to 0.5, preferably 0.1 to 0.3 equivalents of an unsaturated compound (d), which may undergo addition reactions, of the formula

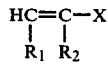

wherein $R_1$ represents a hydrogen atom or methyl or ethyl group, $R_2$ represents a hydrogen atom or methyl group, and X represents a cyano, carboxy, methoxycarbonyl, ethoxycarbonyl, propoxycarbonyl, butoxycarbonyl, carbamoyl, N-methylcarbamoyl or N,N-dimethylcarbamoyl group. From a further aspect, the invention provides a process for the preparation of a hardening agent for aqueous epoxy resin compositions wherein in a first step, an adduct consisting of (a) a polyepoxide compound and (b) a polyalkylene polyether polyol is prepared, generally using a $BF_3$-amine complex as a catalyst, which adduct is subsequently reacted with (c) a polyamine which is optionally reacted with (d) an unsaturated compound which may undergo addition reactions of formula

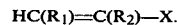

Another aspect of the invention provides the use of the hardening agent obtained by the above-mentioned process, together with one or more polyfunctional epoxide compounds (a), and water, and optionally emulsifiers, in the preparation of hardenable, optionally film-forming coating compositions.

Examples of polyfunctional epoxide compounds (a) containing more than one 1,2-epoxide groups in the molecule, which are preferably insoluble in water and which may be reacted according to the invention with the formation of an adduct with polyalkylenepolyetherpolyols and amines to form the hardening agents according to the invention and can likewise be used together with the hardening agents according to the invention for the preparation of compositions, are:

Epoxides of polyunsaturated hydrocarbons, such as vinylcyclohexene, dicyclopentadiene, cyclohexadiene, cyclododecadiene, cyclododecatriene, isoprene, 1,5-hexadiene, butadiene, polybutadienes, divinylbenzenes and the like; oligomers of epichlorohydrin and the like; epoxyethers of polyhydric alcohols, such as of ethylene, propylene and butylene glycols, polyglycols, thiodiglycols, glycerol, pentaerythritol, sorbitol, polyvinyl alcohol, polyallyl alcohol and the like; epoxyethers of polyhydric phenols, such as of resorcinol, hydroquinone, bis-(4-hydroxyphenyl)-methane bis-(4-hydroxy-3-methylphenyl)-methane, bis-(4-hydroxy-3, 5-dibromophenyl)-methane, bis-(4-hydroxy-3, 5-difluorophenyl)-methane, 1,1-bis-(4-hydroxyphenyl)-ethane, 2,2-bis-(4-hydroxyphenyl)-propane, 2,2-bis-(4-hydroxy-3-methylphenyl)-propane, 2,2-bis-(4-hydroxy-3-chlorophenyl)-propane, 2,2-bis-(4-hydroxy-3, 5-dichlorophenyl)-propane, 2,2-bis-(4-hydroxy-3, 5-dichlorophenyl)-propane, bis-(4-hydroxyphenyl)-phenylmethane, bis-(4-hydroxyphenyl)-diphenylmethane, bis-(4-hydroxyphenyl)-4'-methylphenylmethane, 1,1-bis-(4-hydroxyphenyl)-2,2,2-trichloroethane, bis-(4-hydroxyphenyl)-(4-chlorophenyl)-methane, 1,1-bis-(4-hydroxyphenyl)-cyclohexane, bis-(4-hydroxyphenyl)-cyclohexylmethane, 4,4'-dihydroxydiphenyl, 2,2'-dihydroxydiphenyl, 4,4'-dihydroxydiphenylsulphone and their hydroxyethylethers, phenol-formaldehyde condensation products such as phenol alcohols, phenol aldehyde resins and the like; S- and N-containing epoxides, such as N,N-diglycidylaniline and N,N'-dimethyldiglycidyl-4,4-diaminodiphenylmethane, and epoxides which have been prepared by conventional methods from polyunsaturated carboxylic acids or monounsaturated carboxylic acid esters of unsaturated alcohols, glycidyl esters, polyglycidyl esters (which may be obtained by polymerisation or copolymerisation of glycidyl esters of unsaturated acids or from other acid compounds, such as cyanuric acid, diglycidyl sulphide, cyclic trimethylene, trisulphone or derivatives thereof, and the like).

The above-mentioned polyfunctional epoxide compounds (which expression also includes epoxy resins) may be reacted according to the process of the invention individually or in admixture, optionally in the presence of solvents or softeners, or used for the preparation of compositions. They may also be employed in admixture with monoepoxides. Thus, for example, the following monoepoxides may be used in admixture with the above-mentioned polyepoxide compounds: epoxidised unsaturated hydrocarbons such as butylene, cyclohexene, styrene oxide and the like; halogen-containing epoxides such as epichlorohydrin; epoxyethers of monohydric alcohols such as methyl, ethyl, butyl, 2-ethylhexyl, dodecyl alcohol and the like; epoxyethers of monohydric phenols such as phenol, cresol and other phenols substituted in the o- or p-positions; glycidyl esters of unsaturated carboxylic acids; expoxidised esters of unsaturated alcohols or unsaturated carboxylic acids; and the acetals of glycidaldehyde.

Preferred polyhydric phenols which may be employed are: resorcinol and various bisphenols obtained by condensation of phenol with aldehydes and ketones such as for example formaldehyde, acetaldehyde, acetone, methylethyl ketone, etc. Resins of this type are described in U.S. Pat. Nos. 2,855,159 and 2,589,245.

An especially preferred epoxy resin for use in the invention is a polyphenol glycidyl ether, e.g. a reaction product of epichlorohydrin and 2,2-bis-(4-hydroxyphenyl)-propane (that is, bisphenol A), this epoxy resin having the following theoretical structural formula 1,2,6-triol, α-methylglucoside, pentaerythritol and sorbitol.

The polyalkylene polyetherpolyols may also be prepared from other starting materials, for example, from tetrahydrofuran and alkylene oxide-tetrahydrofuran copolymers; epihalogenohydrins, e.g. epichlorohydrin, as well as aralkylene oxides, e.g. styrene oxide.

The polyalkylene polyetherpolyols may have either primary or secondary hydroxyl groups, and are preferably polyethers prepared from alkylene oxides with 2 to 6 carbon atoms, e.g. polyethylene ether glycols, polypropylene ether glycols and polybutylene ether glycols. The polyalkylene polyetherpolyols may be prepared by known processes, e.g. by the process of Wurtz (1859) described in the Encyclopaedia of Chemical Technology, volume 7, pages 257 to 262, Interscience Publishers, Inc (1951) or in U.S. Pat. No. 1,922,459.

The average molecular weight of component (b) is generally from 200 to 10,000, and preferably from 800 to 1,200.

According to the invention, aliphatic, cycloaliphatic,

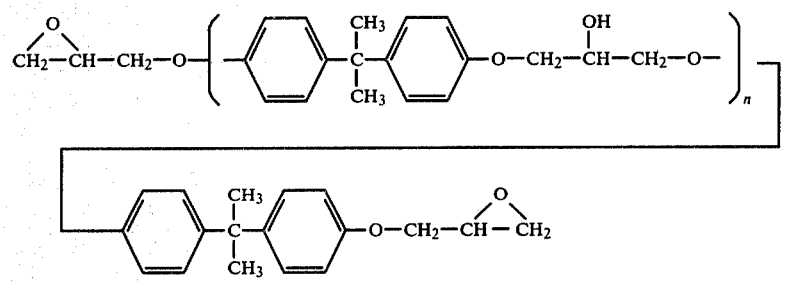

or the homologue thereof based on bisphenol F:

araliphatic amines or mixtures thereof may be reacted as

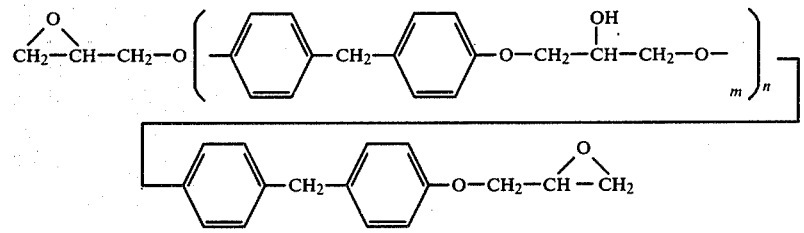

individually or in admixture with bisphenol A. In the above formulae, n represents 0 or an integer up to 10. Normally, n is not greater than 2 or 3 and preferably 1 or less. The epoxy resin has an epoxy equivalent of 160-500.

Suitable polyalkylene polyetherpolyols (b) which can be used according to the invention and which are preferably soluble in water, include, for example, an addition product of an alkylene oxide or an addition product of an alkylene oxide with a polyhydric alcohol. Suitable alkylene oxides are, for example, ethylene oxide, propylene oxide, butylene oxide, amylene oxide and hetero- or block copolymers of these oxides. Preferably, however, the alkylene oxide is ethylene oxide. Suitable polyhydric alochols are both aliphatic and aromatic alcohols individually or in admixture, such as, for example, ethylene glycol, 1,3-propylene glycol, 1,2-propylene glycol, 1,4-butylene glycol, 1,3-butylene glycol, 1,2-butylene glycol, 1,5-pentandiol, 1,4-pentandiol, 1,3-pentandiol, 1,6-hexandiol, 1,7-heptandiol, glycerol, 1,1,1-trimethylolpropane, 1,1,1-trimethylolethane, hexancomponent (c) with epoxide polyalkylene polyether polyol adducts of components (a) and (b). Examples of polyamines which may be used as component (c) are: aliphatic, saturated or unsaturated bifunctional amines, such as lower aliphatic alkylene polyamines, for example ethylene diamine, 1,2-propylene diamine, 1,3-propylene diamine, 1,4-butylene diamine, hexamethylene diamine, 2,2,4-(2,4,4) trimethylhexamethylene diamine; polyalkylene polyamines, e.g. homologous polyethylene polyamines such as diethylene triamine, triethylene tetramine, tetraethylene pentamine or analogous polypropylene polyamines such as for example dipropylene triamine; or polyoxypropylene polyamines and diamines of general formuala $H_2N.CH_2—X—CH_2.NH_2$ (in which X represents a divalent group of formula

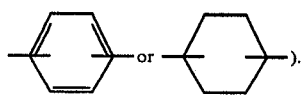

Mention may be made individually of 1,2-, 1,3- and 1,4-bis-(aminomethyl)-benzene or mixtures of these isomers, and 1,2-, 1,3- and 1,4-bis-(aminomethyl-)cyclohexane or mixtures of these isomers. Further examples of compounds which may be used are isophorondiamine (that is, 1-amino-3-aminomethyl-3,5,5-trimethylcyclohexane) and N-aminoethyl-piperazine. As has been indicated above, it is also possible to react all of these amines before reaction with the epoxide polyalkylene polyether polyol adduct of components (a) and (b) with a monounsaturated compound (d) of formula

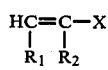

(wherein $R_1$, $R_2$ and X are defined above) to form so-called "cyanoethylated amines" and then to employ these in the invention instead of the pure polyamines of component (c). The procedure described hereinafter is, however, more usual.

Before the reaction product of polyamine (c) and the epoxide polyalkylene polyether adduct of components (a) and (b) is reacted with the monounsaturated compound (d), it may optionally be diluted with water to a solids content of 50.0 to 90% by weight.

The reaction with the monounsaturated compound (d) takes place by the addition of e.g. acrylonitrile at 20° to 70° C., and after the addition the reaction mixture is allowed to stand at an elevated temperature, preferably 50° to 70° C. The most preferred compounds of component (c) are xylylene diamine, 1-amino-3-aminomethyl-3,5,5-trimethylcyclohexane, 2,2,4-(2,4,4)-trimethylhexamethylene diamine or polyoxypropylene polyamine and mixtures thereof.

Acrylonitrile or methacrylonitrile form the preferred compounds of component (d).

Suitable $BF_3$-amine complexes which may be used as a catalyst in the preparation of the adducts of components (a) and (b) are, for example, those which are formed from $BF_3$ and the following amines ($pK_b$ values in parentheses): n-amylamine (10.63); aniline (4.63); β-phenylalanine, that is 2-aminoethylbenzole (9.84); 2-ethylbenzimidazole (6.18); benzylamine (9.33); trans-bornylamine (10.17); 1-amino-3-methylbutane (10.60); 1,4-diaminobutane (11.15); n-butylamine (10.77); t-butylamine (10.83); n-butylcyclohexylamine (11.23); cyclohexylamine (10.66); n-decylamine (10.64); diethylamine (10.49); diisobutylamine (10.91); diisopropylamine (10.96); dimethylamine (10.73); n-dodecanamine, that is laurylamine (10.63); 2-aminoethanol (9.50); ethylamine (10.81); hexadecanamine (10.63); 1-aminoheptane (10.66); 2-aminoheptane (10.88); n-hexylamine (10.56); 2,4-dimethylimidazole (8.36); morpholine (8.33); methylamine (10.66); n-nonylamine (10.64); octadecanamine (10.60); octylamine (10.65); 3-aminopentane (10.59); 3-amino-3-methylpentane (11.01); n-pentadecylamine (10.61); piperazine (9.83); propylamine (10.71); pyrrolidine (11.27); tetradecanamine, that is myristylamine (10.62); tridecanamine (10.63); triethylamine (11.01); and trimethylamine (9.81).

$BF_3$-benzylamine, $BF_3$-monoethylamine, $BF_3$-propylamine and $BF_3$-n-butylamine are preferably used as the catalyst.

For 1 gram equivalent of hydroxyl group to be reacted with 1 gram equivalent of an epoxide group, 100 to 1, preferably 15 to 2 mmol, of the $BF_3$-amine complex catalyst are conveniently used. The reaction of the hydroxyl groups with the epoxide groups can be carried out at a temperature in the range from 20° to 200° C. The reaction temperature is generally dependent on the particular $BF_3$-amine complex used. For example, when $BF_3$-monoethylamine or $BF_3$-benzylamine are used, the reaction temperature is preferably about 130° C. The mixture of compounds containing hydroxyl groups and epoxide groups to be reacted are therefore heated appropriately up to the temperature at which the reaction takes place at a desired rate, for example over 30 minutes to 15 hours. The progress of the reaction is conveniently monitored via the increase in the epoxide equivalent which indicates a reduction in the epoxide groups.

The reaction may be discontinued by cooling the mixture below the reaction temperature. During the reaction a part of the $BF_3$-amine complex is consumed by incorporation of fluoride ions into the reaction product. Any excess of the $BF_3$-amine complex may be destroyed by the addition to the reaction mixture of basic substances such as Fuller's earth, calcium oxide, calcium hydroxide, barium oxide or barium hydroxide in excess. The basic substances are themselves removed by filtration together with the products obtained from reaction with the $BF_3$-amine complexes. The adduct obtained which still contains reactive epoxide groups is added to the polyamine component (c) generally at 20° to 100° C. or alternatively the polyamine is added to the adduct conveniently at 20° to 40° C. The reaction mixture is then allowed to stand at an elevated temperature, preferably at 50°–80° C., with stirring for 1 to 3 hours.

The hardening agents according to the invention are optionally used together with emulsifiers in the preparation of aqueous hardenable epoxy resin compositions which are employed as coating or covering agents.

The epoxy resins hardenable with the hardening agents according to the invention may contain further additives such as, for example, wetting agents. Preferred wetting agents are non-ionic wetting agents, known in the art, which are generally based on modified alkyl phenols, such as for example alkylphenoxypoly-(ethyleneoxy)ethanol, a condensate of nonyl phenol and ethylene oxide, containing 9–10 moles of ethylene oxide for each mole of nonyl phenol, and the like.

The epoxy resins, optionally mixed with diluting agents and/or wetting agents, are generally mixed with water, in an amount such that the resulting dispersion preferably contains up to 50% by weight of water. If a combination of epoxy resin and hardening agent according to the invention is used as a block filler or if pigments are added, the water content may amount up to 90% by weight.

If coloured coating compositions of epoxy resins and hardening agents according to the invention are to be prepared, various additives may be added to the aqueous dispersion containing epoxy resins and hardening agent according to the invention. These additives include pigments such as titanium dioxide and iron oxide; fillers such as asbestos, talc, mortar and other materials similar to cement; pigment dispersing materials and other conventional dyestuffs and coating adjuvants.

The compositions containing epoxy resins and hardening agents according to the invention, based on water, may be applied to substrates in any known way. Suitable methods include: brush application, rolling, spraying, casting, dipping, wiping, pressing, trowelling, electrical precipitation, silk-screen printing etc.

The compositions containing epoxy resins and hardening agents according to the invention may be used as primers, varnishes, fillers, clear sealers, protective paints, coverings, sealings, thin mortars, mortars, and the like. Their use is especially appropriate when resistance to corrosion is desired. The compositions may also be employed with epoxy resin/thermoplastic mixtures such as coal tar, vinyl polymers, etc. They may also be used as binding agents for pressed coal, conductive floor coverings and putty fillers, as adhesives for wood, fabric, leather and metal and for various laminated supports such as cemented floors, walls, swimming pools, glazed tiles, etc. Further, the epoxy resin compositions may be mixed with mortar or cement, water being used in the emulsion to make the cement pasty. Conversely, the water in the cement mixture may be used as a solvent for the epoxy resin dispersion. The addition of the hardening agent according to the invention enables cement and epoxy resin-hardener dispersion to be mixed homogeneously. Thus, it is possible to obtain cement hardened with epoxy resin-hardening agent dispersion.

The following Examples serve to illustrate the invention:

EXAMPLES

Preparation of hardening agents

Example 1

(A) 300 g of polyethylene glycol, having an average molecular weight of 1000 ($\simeq$0.6 equivalents), 470 g of a bisphenol A- diglycidyl ether/bisphenol in a ratio of 60:40 parts by weight having an epoxy value of 180 ($\simeq$2.6 equivalents), and 2 g of a BF$_3$-amine complex (e.g. Anchor 1040) are measured into a 2-liter three-necked flask equipped with a thermometer and stirrer. The flask is connected via a separator to a condenser. Under an inert gas atmosphere of nitrogen, heating is carried out over 30 minutes to 80° C., a homogeneous mixture being formed. The mixture is then heated to 170° C. and this temperature is maintained until the theoretical epoxy value of 385±10 is reached. After standing for 5 hours at 170° C. an epoxy value of 378 is obtained. The viscosity of the product at 25° C., measured in a falling ball viscosimeter according to Höppler, is 9600 mPa.s. The product is used as an intermediate for the preparation of hardening agents according to the invention.

(B) 272 g of xylylene diamine (4 equivalents) are placed in a 1-liter three-necked flask, nitrogen is passed through and 378 g (1 equivalent) of the intermediate from Example 1A are added at room temperature with stirring over 15 to 30 minutes. On completion of the addition, the mixture is stirred for a further hour, the temperature rising to about 60° C. When the temperature drops, the mixture is heated to 80° C. and maintained thereat for 1 hour. The hydrogen equivalent weight (HAV) is 93. The product is diluted with water 80% and the HAV is then 116.

(C) 813 g of this 80% aqueous solution contains 7 equivalents of active aminohydrogen atoms. At 60° C., 74 g of acrylonitrile (corresponding to about 0.2 equivalents per aminohydrogen atom) are added dropwise over 30 minutes. When the addition is complete, the mixture is maintained at 60° C. for a further hour. The hardening agent obtained is in 82% solution, has an HAV of 159 and a viscosity at 25° C. of 2330 mPa.s (measured in a falling-ball viscosimeter according to Höppler).

EXAMPLE 2

(B) 272 g of xylylene diamine (4 equivalents) are placed in a 2-liter three-necked flask, nitrogen is passed through and 473 g (1.25 equivalents) of the intermediate from Example 1A are added at room temperature with stirring over 15 to 30 minutes. When the addition is complete, stirring is continued for a further hour, the temperature rising to about 60° C. When the temperature has dropped, the mixture is heated to 80° C. and maintained thereat for 1 hour. The HAV of the product is 111. This product is diluted to 80% with water and the HAV is then 138.

(C) 932 g of this 80% aqueous solution contain 6.75 equivalents of active aminohydrogen atoms. At 60° C., 71.5 g of acrylonitrile (corresponding to 0.2 equivalents acrylonitrile per aminohydrogen atom) are added dropwise over 30 minutes. When addition is complete, the mixture is kept at 60° C. for a further hour. The hardening agent obtained is in 81% solution, has an HAV of 186 and a viscosity of 5150 mPa.s (measured in a falling-ball viscosimeter according to Höppler).

EXAMPLE 3

(A) Example 1A is repeated, but after standing for 4.5 hours at 170° C. an epoxy value of 391 is obtained.

(B) 136 g of xylylene diamine (2 equivalents) and 170 g of 1-amino-3-aminomethyl-3,5,5-trimethyl cyclohexane (2 equivalents) are placed in a 2-liter three-necked flask, nitrogen is passed through and 489 g (1.25 equivalents) of the intermediate from Example 3A are added at room temperature with stirring over 15 to 30 minutes. When addition is complete, stirring is continued for a further hour, the temperature rising to about 60° C. When the temperature has dropped, the mixture is heated to 80° C. and maintained thereat for 1 hour. The HAV of the product is 118. This product is diluted with water to 80% and the final HAV is 147.

(C) 994 g of this 80° C. aqueous solution contain 6.75 equivalents of active aminohydrogen atoms. At 60° C., 71.5 g of acrylonitrile, corresponding to 0.2 equivalents acrylonitrile per aminohydrogen, are added dropwise over 30 minutes. When addition is complete the mixture is maintained at 60° C. for a further hour. The hardening agent obtained is in 81.5% solution, has an HAV of 197 and a viscosity of 13450 mPa.s (measured in a falling-ball viscosimeter according to Höppler).

EXAMPLE 4

(A) The product of Example 3A is employed.

(B) 489 g (1.25 equivalents) of the intermediate of Example 3A are placed in a 2-liter three-necked flask, nitrogen is passed through and 136 g of xylylene diamine (2 equivalents) and 170 g of 1-amino-3-aminomethyl-3,5,5-trimethyl cyclohexane (2 equivalents) are added in succession at room temperature with stirring over 10-15 minutes. After addition is complete, stirring is continued for a further hour, the temperature rising to about 65° C. When the temperature has dropped, the mixture is heated to 80° C. and maintained thereat for 1 hour. The HAV of the product is 118. This product is diluted to 80% with water and the HAV is 147.

(C) The same procedure as in Example 3C is carried out. The hardening agent obtained is in 81.5% solution, has an HAV of 197 and a viscosity of 13120 mPa.s (measured in a falling-ball viscosimeter according to Höppler).

EXAMPLE 5

(A) &
(B) Examples (3A) and (B) are repeated.

(C) To 882 g of the 80% solution, as described in Example 3B, containing 6.0 equivalents of active aminohydrogen atoms, are added dropwise at 60° C. over 30 minutes, 79.5 g of acrylonitrile, corresponding to 0.25 equivalents of acrylonitrile per aminohydrogen atom. When addition is complete, the mixture is maintained at 70° C. for a further hour. The hardening agent obtained is in 82% solution, has an HAV of 216 and a viscosity of 14520 mPa.s (measured in a falling-ball viscosimeter according to Höppler).

EXAMPLE 6

(A) &
(B) Examples (1A) and (B) are repeated.

(C) To 696 g of the 80% solution, as described in Example (1B), containing 6.0 equivalents of active aminohydrogen atoms, are added dropwise at 50° C. over 30 minutes, 79.5 g of acrylonitrile, corresponding to 0.25 equivalents acrylonitrile per aminohydrogen atom. When addition is complete, the mixture is maintained at 70° C. for 1.5 hours. The hardening agent obtained is in 82% solution, has an HAV of 175 and viscosity of 3150 mPa.s (measured in a falling-ball viscosimeter according to Höppler).

EXAMPLE 7

(C) 932 g of the 80% solution as described in Example (2B), are reacted with 89.5 g of acrylonitrile (0.25 equivalents per aminohydrogen), as described in Example 5C. The hardening agent obtained is in 82% solution, has an HAV of 202 and a viscosity of 5900 mPa.s (as measured in a falling-ball viscosimeter according to Höppler).

Examples 8 to 11

| Example | Intermediate | Reaction | HAV | Viscosity 25° C. |
|---|---|---|---|---|
| 8C | 994g 4B | 89.5g AN 0.25 equivalents per aminohydrogen | 205 | 13900 mPa.s |
| 9C | 813g 1B | 37g AN 0.1 equivalents | 135 | 1850 mPa.s |
| 10C | 932g 2B | 36g AN 0.1 equivalents | 159 | 4640 mPa.s |
| 11C | 994g 3B | 36g AN 0.1 equivalents | 170 | 12500 mPa.s |

Example 12

(A) 300 g of polythylene glycol, having an average molecular weight of 1000 (≃0.6 equivalents), 482 g of a bisphenol A—diglycidyl ether having an epoxy value of 185 (viscosity at 25° C. 9800 mPa.s) and 2 g of a BF$_3$-amine complex are reacted, as described in Example 1A. The product has the following characteristics:
Epoxy value: 388
Viscosity at 25° C.: 13750 mPa.s.

(B) 388 g of the product of Example (12A) are reacted with 272 g of xylylene diamine, as described in Example 1B. The 80% solution in water has an HAV of 118.

(C) 590 g of the 80% solution of Example (12B) are reacted with 53 g of acrylonitrile (0.2 equivalents per aminohydrogen), as described in Example 1C. The HAV of the product is 161 and the viscosity at 25° C. is 3940 mPa.s.

The intermediates described in the following Table 1 were prepared analogously to Example 1A.

Table 1

| Example | Polyalkylene polyol Quantity/equivalents | Average Molecular Weight | Epoxy resin quantity/equivalents | BF$_3$-amine complex | Final Product epoxy value |
|---|---|---|---|---|---|
| 13 A | Polyethylene glycol 60 g / 0.6 | 200 | as in 1 A 470 / 2.6 | 1.75 g | 264 |
| 14 A | Polyethylene glycol 150 g / 0.3 | 1000 | as in 1 A 470 g/ 2.6 | 2.0 g | 267 |
| 15 A | Polyethylene glycol 600 g / 0.9 | 1000 | as in 1 A 470 g / 2.6 | 2.0 g | 640 |
| 16 A | Polyethylene glycol 300 g / 0.6 | 2000 | as in 1 A 470 g / 2.6 | 2.2 g | 338 |
| 17 A | Polypropylene glycol 300 g / 0.6 | 1000 | as in 1 A 470 g / 2.6 | 2.0 g | 388 |
| 18 A | based on trimethylol propane and propylene oxide 500 g / 0.6 | 2500 | as in 1 A 470 g / 2.6 | 2.3 g | 482 |
| 19 A | based on pentaerythritol and propylene oxide 90 g / 0.6 | 600 | as in 1 A 470 g / 2.6 | 2.2 g | 278 |

1.25 Equivalents, relative to the epoxide groups, of the intermediates listed under Examples (13A to 19A) are reacted with 136 g of xylylene diamine (2 equivalents) and 170 g of 1-amino-3-aminomethyl-3,5,5-trimethyl cyclohexane analogously to Example (3B) (2 equivalents).

The HAV's of the products are given in Table 2.

TABLE 2

| Example | HAV of 80% aqueous solution |
|---|---|
| 13B | 118 |
| 14B | 119 |
| 15B | 205 |

TABLE 2-continued

| Example | HAV of 80% aqueous solution |
|---|---|
| 16B | 135 |
| 17B | 147 |
| 18B | 168 |
| 19B | 121 |

The products of Examples 13B to 19B we then reacted according to Example (3C), to give the products having the properties given in Table 3.

TABLE 3

| Example | Product | Acrylonitrile | HAV of final product |
|---|---|---|---|
| 13C | 590g 13B | 53g | 161 |
| 14C | 595g 14B | 53g | 162 |
| 15C | 1025g 15B | 53g | 270 |
| 16C | 675g 16B | 53g | 182 |
| 17C | 735g 17B | 53g | 197 |
| 18C | 840g 18B | 53g | 223 |
| 19C | 605g 19B | 53g | 165 |

EXAMPLE 20

136 g of xylylene diamine (2 equivalents) and 170 g of 1-amino-3-aminomethyl-3,5,5-trimethylcyclohexane (2 equivalents) are placed in a 2-liter three-necked flask and nitrogen is passed through. 71.5 g of acrylonitrile are added dropwise at 60° C. over 30 minutes. When addition is complete the mixture is maintained at 60° C. for a further hour. To this cyanoethylated polyamine mixture, is added, at room temperature with stirring, 489 g (1.25 equivalents) of the intermediate of Example 3A over 15 to 30 minutes. When addition is complete, the mixture is stirred for a further hour, the temperature rising to about 60° C. When the temperature has dropped, the mixture is heated to 80° C. and maintained thereat for one hour. It is then diluted with water to 81.5% solids. The hardening agent obtained has an HAV of 197 and a viscosity of 13300 mPa.s (measured in a falling-ball viscosimeter according to Höppler).

Preparation of epoxy resin dispersions

Epoxy resin dispersions which may be combined with the hardening agents according to the invention are described e.g. in the following patent specifications: Austrian Pat. No. 286647 (equivalent to British Pat. No. 1,244,424) and Japenese Pat. No. 29.625/71. as well as Swiss Patent Specification bearing the file number 11104/72. The following epoxy resins are preferably employed.

EXAMPLE 21

Epoxy resin A (epoxy value about 195)

72 g of an epoxy resin—emulsifier mixture containing 66 g of a mixture of 88% by weight of an epoxy resin based on bisphenol A and epichlorohydrin with an epoxide equivalent of about 186 and a viscosity of 9000 mPa.s (measured at 25° C.), and 12% by weight of 2-ethyl-hexylglycidyl ether were mixed while heating with 6 g of an emulsifier mixture consisting of 2.67 g of an addition product of 25-30 moles of ethylene oxide to 1 mole of abietic acid, 1 g of an addition product of 30 moles of ethylene oxide to 1 mole of p-nonyl-phenol, 1 g of an addition product of 10 moles of ethylene oxide to 1 mole of p-nonyl-phenol and 1.33 g of n-dodecyl alcohol. (This mixture corresponds to the epoxy resin—emulsifier mixture of Example 7 of Swiss Pat. No. 603 738.

EXAMPLE 22

Epoxy resin B (epoxy value about 185)

80 g of an epoxy resin—emulsifier mixture consisting of 75.2 g of a mixture of 60% by weight of an epoxide resin based on bisphenol A and epichlorohydrin and 40% by weight of an epoxy resin based on crude bisphenol F and epichlorohydrin with a mixed epoxide equivalent of approx. 180 and a viscosity of 6500 mPa.s, measured at 25° C., was mixed, with heating, with 4.8 g of an emulsifier mixture consisting of 2.14 g of an addition product of 25-30 moles of ethylene oxide to 1 mole of abietic acid, 0.8 g of an addition product of 4 moles of ethylene oxide to 1 mole of p-nonyl-phenol, 0.8 g of an addition product of 10 moles of ethylene oxide to 1 mole of p-nonyl-phenol and 1.06 g of n-dodecyl alcohol.

EXAMPLE 23

Epoxy resin C 100 g of a mixture consisting of 60% by weight of an epoxy resin based on bisphenol A and epichlorohydrin and 40% by weight of an epoxy resin based on crude bisphenol F and epichlorohydrin with a mixed epoxide value of approx. 180 and a viscosity of 6500 mPa.s, measured at 25° C.

Example 24

Epoxy resin D

Epoxy resin based on bisphenol A and epichlorohydrin with an epoxide value of approx. 185 and a viscosity of 9000 mPa.s, measured at 25° C.

Example 25

100 g of each of the preferably employed epoxy resins A,B,C and D were mixed in an equivalent manner by means of an agitator with the hardening agents according to the invention from Examples (1C) to (19C), 20, and (1B) to (3B). Water was added until the dispersions were 60%. The quantities are given in the following table 4.

Table 4

| Quantities of hardening agent per 100g of epoxy resin | | | | |
|---|---|---|---|---|
| | A | B | C | D |
| Hardening agent from Example 1C | 82 | 86 | 88 | 86 |
| " 2C | 95 | 100 | 103 | 100 |
| " 3C | 101 | 106 | 109 | 106 |
| " 4C | 101 | 106 | 109 | 106 |
| " 5C | 111 | 117 | 120 | 117 |
| " 6C | 90 | 95 | 97 | 95 |
| " 7C | 104 | 109 | 112 | 109 |
| " 8C | 105 | 111 | 114 | 111 |
| " 9C | 69 | 73 | 75 | 73 |
| " 10C | 82 | 86 | 88 | 86 |
| " 11C | 87 | 92 | 94 | 92 |
| " 12C | 83 | 97 | 89 | 97 |
| " 13C | 83 | 97 | 89 | 97 |
| " 14C | 83 | 97 | 90 | 97 |
| " 15C | 139 | 146 | 150 | 146 |
| " 16C | 93 | 98 | 101 | 98 |
| " 17C | 101 | 106 | 109 | 106 |
| " 18C | 114 | 120 | 124 | 120 |
| " 19C | 85 | 89 | 92 | 89 |
| " 1B | 60 | 63 | 64 | 63 |
| " 2B | 71 | 75 | 77 | 75 |
| " 3B | 75 | 79 | 82 | 79 |
| " 20 | 101 | 106 | 109 | 106 |

The dispersions showed excellent stability during processing (that is, up to the start of the cross-linking reaction between the resin and hardener components) which amounted to a time of from 30 minutes to 5 hours. Using the epoxy resin A, the aqueous dispersions were applied to phosphated iron sheets and asbestos cement boards in a layer thickness of approx. 200 μm. The results of tests on the coated sheets are given below in Table 5. The term "tack-free" used in the tables should be defined as the moment whereat a touch with a finger-tip on the surface of a coated sheet shows no tackiness.

The dispersions prepared with epoxy resins B, C and D and the films made therefrom yielded similar properties to those with epoxy resin A.

Example 26

100 g of each of the preferably employed epoxy resins A and C were ground on a roller with 150 g of non-chalky titanium dioxide of the rutile type and 5 g of finely divided silica. Equivalent quantities of the hardening agents from Examples (1C) to (12C) and (1B) to

TABLE 5

| Dispersion with epoxy resin A | | | | | | | | |
|---|---|---|---|---|---|---|---|---|
| Test on asbestos cement boards | 1 C | 2 C | 3 C | 4 C | 5 C | 6 C | 7 C | 8 C |
| Pot life | 35' | 1h30' | 2h55' | 3h | 3h10' | 50' | 1h45' | 3h10' |
| Tack-free | 4h30' | 5h15' | 7h20' | 7h15' | 7h40' | 5h10' | 5h25' | 7h25' |
| Hardening | ca. 24h | ca. 24h | ca. 30h | ca. 30h | ca. 30h | ca. 24h | ca. 24h | ca. 30h |
| Film formation | | | | ← perfect → | | | | |
| Film flow | | | | ← perfect → | | | | |
| Gloss | | | | ← perfect → | | | | |
| Test on phosphated iron sheet | | | | | | | | |
| Pendulum hardness after 1 week (Konig) | 90 sec. | 70 sec. | 87 sec. | 90 sec. | 95 sec. | 74 sec. | 90 sec. | 97 sec. |
| Erichsen depression DIN 53156 | 10 mm | 10 mm | 10 mm | 10 mm | 11 mm | 12 mm | 11 mm | 12 mm |
| cross-hatch adhesion acc. DIN 53153 | 0 | 1 | 1 | 0 | 0 | 0 | 0 | 0 |
| Test on asbestos boards | 9 C | 10 C | 11 C | 12 C | 13 C | 14 C | 15 C | 16 C |
| Pot life | 30' | 1h20' | 2h30' | 25' | 1h20' | 1h35' | 3h55' | 2h40' |
| Tack-free | 4h | 5h | 6h55' | 4h | 5h | 5h20' | 9h10' | 7h |
| Hardening | ca. 24h | ca. 24h | ca. 24h | ca. 24h | ca. 24h | ca. 24h | ca. 30h | ca. 24h |
| Film formation | | | | ← perfect → | | | | |
| Film flow | | | | ← perfect → | | | | |
| Gloss | | | | ← perfect → | | | | |
| Test on phosphated iron sheet | | | | | | | | |
| After 1 week (Konig) | 88 sec. | 65 sec. | 86 sec. | 68 sec. | 70 sec. | 72 sec. | 95 sec. | 90 sec. |
| Erichsen depression DIN 53156 | 8.5 mm | 9 mm | 9 mm | 8 mm | 9 mm | 9 mm | 10 mm | 10 mm |
| cross-hatch adhesion acc. DIN 53153 | 1 | 1 | 0 | 1 | 1 | 1 | 0 | 0 |
| Test on asbestos cement boards | 17 C | 18 C | 19 C | 1 B | 2 B | 3 B | 20 | |
| Pot life | 2h50' | 5h55' | 2h40' | 25' | 1h10' | 2h5' | 2h55' | |
| Tack-free | 7h10' | 11h | 7h | 4h | 5h | 6h | 7h15' | |
| Hardening | ca. 24h | ca. 36h | ca. 24h | ca. 24h | ca. 24h | ca. 24h | ca. 24h | |
| Film formation | | | | ← perfect → | | | | |
| Film flow | | | | ← perfect → | | | | |
| Gloss | | | | ← perfect → | | | | |
| Test on phosphated iron sheet | | | | | | | | |
| Pendulum hardness after 1 week (Konig) | 90 sec. | 85 sec. | 80 sec. | 86 sec. | 65 sec. | 80 sec. | 86 sec. | |
| Erichsen depression DIN 53156 | 10 mm | 9 mm | 8.5 mm | 9 mm | 8 mm | 9 mm | 10 mm | |
| cross-hatch adhesion acc. DIN 53153 | 0 | 1 | 1 | 1 | 1 | 1 | 1 | |

(3B) were added by means of an agitator and water was added until 55% dispersions were obtained. The quantities are set out in the following Table 6.

Table 6

| Quantities of hardening agent per 225g of epoxy resin/TiO$_2$/silica mixture | | |
|---|---|---|
| | A | C |
| Hardening agent from Example | | |
| 1C | 82 | 88 |
| 2C | 95 | 103 |
| 3C | 101 | 109 |
| 4C | 101 | 109 |
| 5C | 111 | 120 |
| 6C | 90 | 97 |
| 7C | 104 | 112 |
| 8C | 105 | 114 |
| 9C | 69 | 75 |
| 10C | 82 | 88 |
| 11C | 87 | 94 |
| 12C | 83 | 89 |
| 1B | 60 | 64 |
| 2B | 71 | 77 |
| 3B | 75 | 82 |

The dispersions showed an excellent stability during processing (that is, up to the start of the cross-linking reaction between the resin and hardener components) which took from 30 minutes to 3 hours. Using epoxy resin C, the aqueous dispersion paints were applied to phosphated iron sheets and asbestos cement boards in a layer thickness of approx. 100 μm. The results of application are set out in the following Table 7.

The dispersions prepared with epoxy resin A and the films made therefrom showed similar test results to those using epoxy resin C.

In the above Tables, the expression "pot life" is intended to mean the time elapsing before a dispersion of 50 g of the epoxy resin, 50 g of water and an equivalent quantity of the hardening agent according to the invention from Examples (1C) to (19C) and (1B) to (3B) gels or before the viscosity of the dispersion rises to such an extent that it is no longer possible to process it properly.

Example 27

A mixture consisting of 80 g of fine-grained quartz sand (grain size 0.5 mm), 160 g of coarse-grained quartz sand, 80 g of cement, 11 g of epoxy resin B and 11.7 g of the hardening agent according to the invention from Example (3C) was mixed homogeneously in a mixer and stirred with 80 g of water until having a pasty consistency. This substance was worked with a wiper blade into an approximately 5 mm thick concrete floor covering which showed, after hardening, excellent resistance to oil and water. The tensile, compressive and bending strengths of the concrete mixture were improved by approx. 20% by the addition of the epoxy resin/hardening agent dispersion.

It is not intended that the examples given herein should be construed to limit the invention thereto, but rather they are submitted to illustrate some of the specific embodiments of the invention. Resort may be had to various modifications and variations of the present

TABLE 7

| Disperson with epoxy C | | | | | | | | |
|---|---|---|---|---|---|---|---|---|
| Test on asbestos cement boards | 1 C | 2 C | 3 C | 4 C | 5 C | 6 C | 7 C | 8 C |
| Pot life | 30' | 1h25' | 2h50' | 2h50' | 3h | 50' | 1h40' | 3h5' |
| Tack-free | 3h | 4h | 5h | 5h | 5h | 3h | 4h | 5h |
| Hardening | ca. 24h | ca. 24h | ca. 24h | ca. 24h | ca. 24h | ca. 24h | ca. 24h | ca. 24h |
| Film formation | ← pefect → | | | | | | | |
| Film flow | ← perfect → | | | | | | | |
| Gloss | ← perfect → | | | | | | | |
| Test on phosphated iron sheet | | | | | | | | |
| Pendulum hardness after 1 week (Konig) | 105 sec. | 80 sec. | 92 sec. | 105 sec. | 110 sec. | 83 sec. | 105 sec. | 112 sec. |
| Erichsen depression DIN 53156 | 4.5 mm | 3.5 mm | 3.5 mm | 4.6 mm | 5 mm | 3.5 mm | 5 mm | 5 mm |
| Test on asbestos cement boards | 9 C | 10 C | 11 C | 12 C | 1 B | 2 B | 3 B | |
| Pot life | 30' | 1h15' | 2h30' | 30' | 30' | 1h15' | 2h | |
| Tack-free | 3h | 4h | 4h30' | 3h | 3h | 4h | 4h | |
| Hardening | ca. 24h | ca. 24h | ca. 24h | ca. 24h | ca. 24h | ca. 24h | ca. 24h | |
| Film formation | ← perfect → | | | | | | | |
| Film flow | ← perfect → | | | | | | | |
| Gloss | ← perfect → | | | | | | | |
| Test on phosphated iron sheet | | | | | | | | |
| Pendulum hardness after 1 week (Konig) | 100 sec. | 80 sec. | 85 sec. | 80 sec. | 100 sec. | 82 sec. | 85 sec. | |
| Erichsen depression DIN 53156 | 4 mm | 3 mm | 3 mm | 3 mm | 4 mm | 3 mm | 3 mm | |

We claim:

1. A hardening agent for an aqueous epoxy resin composition comprising a reaction product of an adduct, obtained in a first reaction step, of (a) at least one polyepoxide compound and (b) at least one polyalkylene polyether polyol, with (c) at least one compound selected from the group consisting of aliphatic, cycloaliphatic and heterocyclic polyamine.

2. A hardening agent as claimed in claim 1 wherein (a) is at least one water-insoluble polyepoxide compound and (b) is at least one water-soluble polyalkylene polyether polyol.

3. A hardening agent as claimed in claim 1 comprising a reaction product obtained from 20 to 80% by weight of an adduct derived from (a) 2 to 4 equivalents of at least one polyepoxide compound and (b) 0.2 to 1.5 equivalents of at least one polyalkylene polyether polyol by reaction with 80 to 20% by weight of component (c) comprising at least one polyamine, the quantity of amine used being in 2 to 10 times excess, relative to the reacting epoxide groups and hydrogen atoms bonded to the nitrogen.

4. A hardening agent as claimed in claim 1 wherein additionally (d) an unsaturated compound is reacted by addition with the component (c) before or after the reaction with the adduct of components (a) and (b).

5. A hardening agent as claimed in claim 4 whereby for each hydrogen atom bonded to the nitrogen of component (c), this component is reacted by addition before or after the reaction with the adduct of components (a) and (b) with up to 0.5 equivalents of an unsaturated compound (d) of the formula $HC(R_1)=C(R_2)-X$ wherein $R_1$ is selected from the group consisting of H, $-CH_3$ and $-C_2H_5$, $R_2$ is selected from the group consisting of H and $-CH_3$ and X is selected from the group consisting of $-CN$, $-COOH$, $-COOCH_3$, $-COOC_2H_5$, $-COOC_3H_7$, $-COOC_4H_9$, $-CONH_2$.

6. A process for the preparation of a hardening agent for aqueous epoxy resin compositions wherein in a first step an adduct consisting of (a) at least one polyepoxide compound and (b) at least one polyalkylene polyether polyol with an average molecular weight of from 200 to 10 000 is prepared in the presence of a $BF_3$-amine complex as a catalyst and subsequently reacted with (c) at least one compound selected from the group consisting of aliphatic, cycloaliphatic and heterocyclic polyamine.

7. A process as claimed in claim 6 wherein the reaction product of components (a), (b) and (c) is further reacted with (d) an unsaturated compound of formula $HC(R_1)=C(R_2)-X$, wherein $R_1$, $R_2$ and X are as defined above at a temperature of from 20° to 70° C.

8. A process as claimed in claim 6, wherein component (c) is additionally first reacted at temperatures of from 20° to 70° C. with (d) an unsaturated compound of formula $HC(R_1)=C(R_2)-X$ wherein $R_1$, $R_2$ and X are as defined above and further reacted with the adduct of components (a) and (b).

9. A process as claimed in claim 6 wherein (a) 2 to 4 equivalents of at least one polyepoxide compound and (b) 0.2 to 1.5 equivalents of at least one polyalkylene polyether polyol is reacted in a first step in the presence of a $BF_3$-amine complex as catalyst at a temperature of 20° to 200° C. and a further reacted with component (c) at least one polyamine wherein the quantity of amine used being in 2 to 10 times excess, relative to the reacting epoxyde groups and hydrogen atoms bonded to the nitrogen at a temperature of 20° to 100° C.

10. Hardenable film forming coating compositions comprising as essential ingredients a hardening agent as claimed in claim 1, at least one compound having more than one epoxy group and water.

* * * * *

UNITED STATES PATENT AND TRADEMARK OFFICE
CERTIFICATE OF CORRECTION

PATENT NO. : 4,197,389

DATED : April 8, 1980

INVENTOR(S) : Wihelm Becker and Horst Karasmann

It is certified that error appears in the above—identified patent and that said Letters Patent is hereby corrected as shown below:

Col. 5, line 19; "epichlorohydrin" should read -- epichlorhydrin --
Col. 5, line 62; "alochols" should read -- alcohols --
Col. 6, line 67; "formuala" should read -- formula --
Col. 8, line 63; "resins" should read -- resin --
Col. 9, lines 37;     "bisphenol in a ratio" should read -- bisphenol
   F- diglycidyl ether mixture in a ratio --
Col. 12, line 15, inbetween Examples 8-11 and Example 12, insert -- In the
   above Table, AN designates acrylonitrile. In Examples 8C) - 11C) the
   procedure was the same as in Example 5C. --
Col. 13, line 46; "Japenese" should read -- Japanese --
Col. 20, line 8; "10 000" should read -- 10,000 --
Col. 20, line 31; "epoxyde" should read -- epoxide --

*Signed and Sealed this*

*Nineteenth* Day of *August 1980*

[SEAL]

*Attest:*

SIDNEY A. DIAMOND

*Attesting Officer*     *Commissioner of Patents and Trademarks*